June 28, 1960

G. CUSUMANO 2,942,267

CORRUGATED FASTENER STRIP

Filed Nov. 2, 1959

INVENTOR.
GIOCHINO CUSUMANO
BY J. Walton Bader
ATTORNEY

United States Patent Office
2,942,267
Patented June 28, 1960

2,942,267

CORRUGATED FASTENER STRIP

Giochino Cusumano, Glendale, N.Y., assignor to Swingline Industrial Corporation, Long Island City, N.Y., a corporation of New York Filed Nov. 2, 1959, Ser. No. 850,384

3 Claims. (Cl. 1—56)

This invention relates to a corrugated fastener strip composed of a plurality of adjacently disposed corrugated fastener elements which is disposable into the magazine of a device for driving such elements into work.

Corrugated fasteners themselves are, of course, old but conventionally are driven into work by setting an individual fastener into the work and then mechanically driving it home by means of a hammer or similar tool.

With the advent of present high labor costs the conventional method of driving such fasteners cannot be economically employed. In order to utilize such fasteners automatic (preferably fluid operated) machinery must be employed.

Conventional fluid operated fastener driving equipment (such as used to drive nails or staples) comprises a magazine wherein are disposed a number of nails or staples in adhesive relationship with one another. An opening is provided in the forward end of the magazine to accommodate the foremost member of the strip of nails or staples. A driver blade is designed to impinge upon said foremost member of the strip, to sever it from the remainder of the strip, and to drive it into the work.

If individual corrugated fasteners, such as are shown in the instant invention, are adhesively secured to one another in nested relationship, and are then placed into a magazine of the fluid operated fastener driving equipment the results are not satisfactory. Since the thickness of the individual corrugated fastener element must necessarily be relatively small, both for economy and proper driving qualities while the thickness of the driver blade must be relatively large so as to have sufficient strength to drive a fastener element home without being deformed, and to do this for thousands of strokes, a driver blade of correct thickness will be too thick to drive only one fastener element.

If the designer of the driving equipment seeks to obviate this difficulty by corrugating the driving blade (since a straight driving blade will have to be even thinner than the fastener driven) then he finds that the blade has even less strength because of the corrugated form.

In addition, since the manufacturing process for a corrugated fastener strip involves the placing of adhesive upon those adjacent portions of the individual fastener elements in contact with one another, severing of an individual fastener from the strip by the driver blade is most difficult with conventional nested arrangement of such elements because too much of the surfaces of adjacent elements are in adhesive contact.

After much experimentation with the above problems I have discovered the solution thereto. If adjacent individual fastener elements are adhesively secured to one another, not in conventional nested relationship but in lateralmost point to lateralmost point relationship, then the problems set forth above are obviated. In addition, such relationship causes the adhesive securement of only from 15% to 30% of the surface of adjacent elements so that severing of the individual elements from one another by the driver blade of a fastener driving machine can be easily done.

The best mode known to the applicant to carry out the invention set forth in the instant application will now be described by reference to the accompanying drawings which are made a part of this specification. In this connection, however, the reader is cautioned that the specific embodiments of the invention set forth herein are for illustrative purposes and for purposes of example only. Various changes and modifications could obviously be made within the spirit and scope of this invention.

Figure 1:
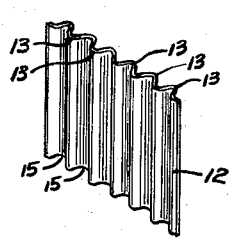
Fig. 1 is a perspective view of an individual corrugated fastener element which composes the corrugated fastener strip of this invention.
Figure 2:
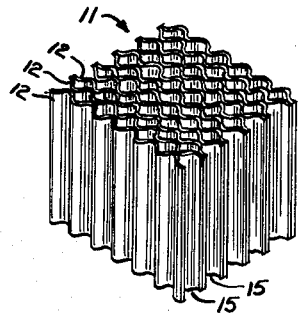
Fig. 2 is a perspective view of a portion of the corrugated fastener strip of this invention. While such strip could be made of the length shown in Fig. 2 the preferred length of such strip is generally longer.
Figure 3:
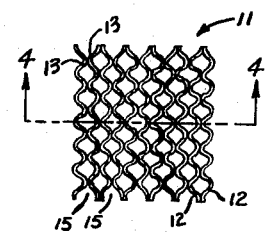
Fig. 3 is a top plan view of the corrugated fastener strip shown in Fig. 2.
Figure 4:
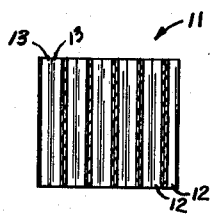
Fig. 4 is a sectional view of the corrugated fastener strip shown in Fig. 3 taken along lines 4—4 of Fig. 3.
Figure 5:
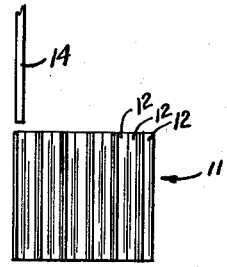
Fig. 5 is a side elevational view of the corrugated fastener strip shown in Fig. 2 showing the position of impingement of a driver blade upon the foremost member of the strip when such strip is placed within a fastener driving machine.
Figure 6:
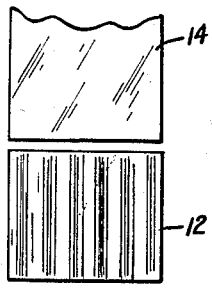
Fig. 6 is a front view of the elements shown in Fig. 5.

Further describing the best mode of carrying out the instant invention by reference to the accompanying drawings, the corrugated fastener strip 11 of this invention is formed of a plurality of laterally disposed individual fastener elements 12. Each of corrugated fastener elements 12 is formed with a plurality of lateralmost points 13. Corrugated fastener strip 11 is formed by the adhesive securement of a number of individual fastener elements 12 in lateralmost point to lateralmost point relationship with one another. This relationship is shown in Figs. 2 and 3 with particular clarity.

The adhesive used to secure fastener elements 12 to one another is conventional in this art. The conventional staple cement that is used to make adjacent staple elements of the conventional staple strip cohere to one another is perfectly satisfactory. A conventional staple cement that can be used is manufactured by the E. I. du Pont de Nemours Corporation under its designation of "Staple Cement No. 54038" and consists essentially of a high viscosity solution of nitrocellulose in butyl acetate, acetone and ethyl alcohol. The particular adhesive used, however, is not a feature of this invention and other adhesive which will have the required properties will also be perfectly satisfactory. The required properties are good adhesion of the elements to one another while in the form of a strip, but permitting easy severance of the foremost element of the strip when the driver blade of the fastener driving machine impinges upon such foremost element. The adhesive must be of such type, also, as will not jam the machine in operation.

With the foregoing description the operation of the instant invention will now be explained.

The corrugated fastener strip 11 is prepared and takes the form shown in Figs. 2, 3, 4 and 5. The strip 11 is then placed in the magazine (not shown) of a fastener driving machine. The driver blade 14 of the machine (which is made in non-corrugated form) is designed to impinge upon the foremost fastener of the strip 11.

It is to be carefully noted that since the individual fastener elements 12 composing strip 11 are in lateralmost point to lateralmost point (13) relationship with one another a substantial clearance space 15 is present between adjacent elements 12. In a typical form of corrugated fastener used this clearance space measures ⅜ inch. However, since the driver blade must sever an individual fastener element the usable clearance space is ½ this amount, or, in the example given, 3/16 inch. Thus a driver blade of straight configuration of 3/16 inch can be used. This thickness of driver blade is, of course, much more than could be obtained with any other configuration of fastener elements composing strip 11.

The lateralmost point to lateralmost point relationship of the individual corrugated fastener elements composing strip 11 also permits the adhesion of only a portion of the surface of each individual fastener element 12 to the adjacent element. With the corrugated fasteners used in this invention the portion of the surface involved is 15% to 30% while the remaining surface of each fastener element 12 is free of adhesive contact to the adjacent element. Preferably the portion of the surface of each fastener element adhesively secured to the adjacent element should be substantially 25%. The fact that the total surface of each fastener element 12 is not adhesively secured to the adjacent element permits easy severance of a fastener element from the strip when struck by the driver blade of the fastener driving machine. On the other hand, with conventional nested adhesion of adjacent fastener elements the adhesion of such adjacent elements to one another is so great that such easy severance cannot be obtained.

Thus the objects of the invention are achieved.

I claim:

1. A corrugated fastener strip comprising a plurality of laterally disposed individual corrugated fastener elements adhesively secured in lateralmost point to lateralmost point relationship with one another.

2. A corrugated fastener strip comprising a plurality of laterally disposed individual corrugated fastener elements adhesively secured in lateralmost point to lateralmost point relationship with one another, wherein the adhesively secured portions of adjacent fastener elements cover 15% to 30% of the surface of each of said fastener elements.

3. A corrugated fastener strip comprising a plurality of laterally disposed individual corrugated fastener elements adhesively secured in lateralmost point to lateralmost point relationship with one another, wherein the adhesively secured portions of adjacent fastener elements cover approximately 25% of the surface of each of said fastener elements.

No references cited.